United States Patent [19]

Grundei

[11] Patent Number: 4,485,899

[45] Date of Patent: Dec. 4, 1984

[54] SHOCK ABSORBER UNIT FOR VEHICLES

[75] Inventor: Manfred Grundei, Niederwerrn, Fed. Rep. of Germany

[73] Assignee: Fichtel & Sachs AG, Schweinfurt, Fed. Rep. of Germany

[21] Appl. No.: 403,051

[22] Filed: Jul. 29, 1982

[30] Foreign Application Priority Data

Aug. 7, 1981 [DE] Fed. Rep. of Germany ....... 3131262

[51] Int. Cl.³ .............................................. F16F 9/52
[52] U.S. Cl. .................................. 188/277; 188/315; 188/322.17; 236/93 R
[58] Field of Search ............... 188/276, 277, 279, 315, 188/322.16, 322.17, 322.18; 267/64.17, 64.13; 236/93 R, 93 A

[56] References Cited

U.S. PATENT DOCUMENTS

| | | | |
|---|---|---|---|
| 2,196,436 | 4/1940 | Briggs | 188/276 |
| 2,695,079 | 11/1954 | Brundrett | 188/315 |
| 3,674,120 | 7/1972 | Johnson | 188/277 |
| 4,238,009 | 12/1980 | Wossner et al. | 188/315 |
| 4,369,864 | 1/1983 | de Carbon | 188/277 |

FOREIGN PATENT DOCUMENTS

| | | |
|---|---|---|
| 1186292 | 7/1958 | Fed. Rep. of Germany . |
| 1146705 | 4/1963 | Fed. Rep. of Germany . |
| 2257557 | 6/1974 | Fed. Rep. of Germany . |
| 2340987 | 2/1975 | Fed. Rep. of Germany . |
| 2020778 | 11/1979 | United Kingdom . |

OTHER PUBLICATIONS

Saitou, Abstract of Japanese Application JP-A-5520936, Published Apr. 19, 1980 in Patent Abstracts of Japan, vol. 4, No. 53.

*Primary Examiner*—Bruce H. Stoner, Jr.
*Assistant Examiner*—Robert J. Oberleitner
*Attorney, Agent, or Firm*—Toren, McGeady and Stanger

[57] ABSTRACT

In a shock absorber unit for vehicles of the double-tube type a piston rod guiding and sealing unit is provided adjacent a first end of a cylinder and a container surrounding the cylinder, and a bottom valve unit is provided at a second end of the cylinder and the container, respectively. The cavity within the cylinder is divided into two working chambers by a piston unit. The piston unit is connected to a piston rod extending through the piston rod guiding and sealing unit. The cavity within the cylinder is filled with a damping liquid. The compensation chamber defined radially between the cylinder and the container is partially filled with damping liquid and partially filled with gas. Adjacent the piston rod guiding and sealing unit, there is provided a by-pass connection the working chamber adjacent the piston rod guiding and sealing unit and the compensation chamber. This by-pass defines a throttling flow cross-sectional area. This flow cross-sectional area is defined by a temperature sensitive member having a high coefficient of thermal expansion, such that the throttling flow cross-sectional area is reduced in response to increasing temperature. By this reduction the reduction of viscosity is compensated for, such as to maintain the damping characteristic of the shock absorber unit approximately invariable within a predetermined range of operational temperatures.

6 Claims, 8 Drawing Figures

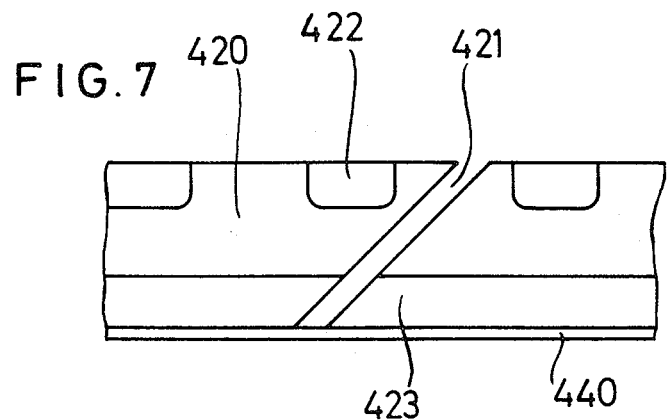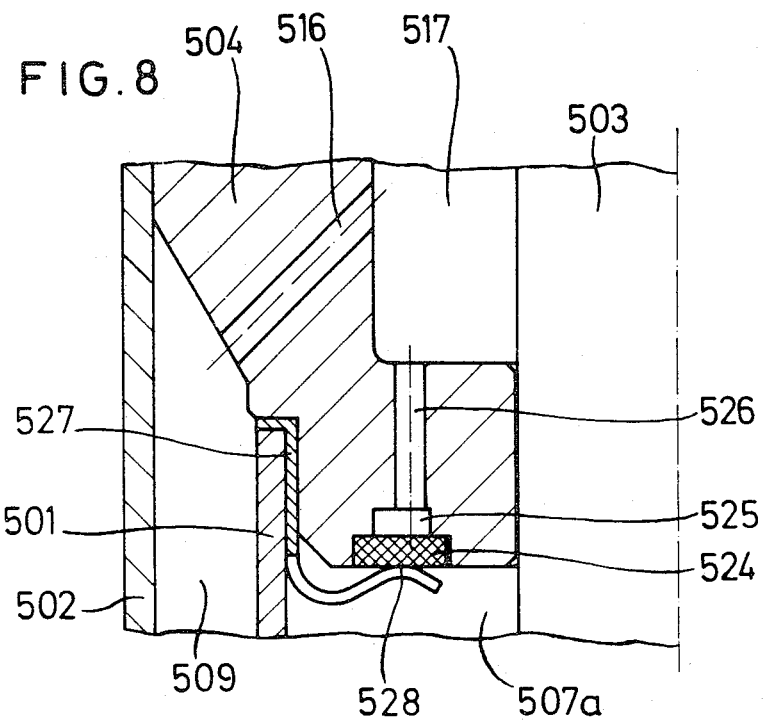

SHOCK ABSORBER UNIT FOR VEHICLES

SUMMARY OF THE INVENTION

The present invention is directed to a shock absorber unit to be used particularly as an insert for a compression strut of a vehicle. Such a shock absorber unit comprises a cylinder having an axis and first and second ends, respectively, and defining a cavity therein. A piston rod guiding and sealing unit is provided adjacent the first end of the cylinder and includes a piston rod guiding member. A piston unit is provided within the cavity and divides the cavity into two working chambers. The piston unit is provided with at least one piston passage connecting the working chambers. A piston rod is connected to the piston unit within the cavity and extends through the guiding and sealing unit. A container surrounds the cylinder. A first end of the container is adjacent the first end of the cylinder and a second end of the container is adjacent the second end of the cylinder. A compensation chamber is defined radially between the cylinder and the container. The container is closed at its second end by a bottom wall. A bottom valve unit is provided adjacent the second ends of the cylinder and the container and provides a flow passage between the cavity and the compensation chamber. A by-pass extends between the cavity and the compensation chamber adjacent the first ends of the cylinder and the container, respectively. This by-pass defines a throttling flow cross-sectional area. The cavity is filled with a damping liquid. The compensation chamber is partially filled with the damping liquid and partially with a gas.

F or the venting of hydro-pneumatic double-tube shock absorbers it is known to arrange connection passages between the upper working chamber and the compensation chamber in the piston rod guide unit. German Auslegeschrift No. 1,146,705 shows a pre-opening arranged between the cylinder and the guide member and opening into an overflow vessel of pot-form. This overflow vessel of pot-form has the purpose merely of ensuring that when the shock absorber is stationary gas does not immediately flow back out of the compensation chamber into the upper working chamber.

For the temperature compensation of the damping forces it is known from German Offenlegungsschrift No. 2,917,318 to provide the piston with a gapped piston ring, the cross-sectional area formed by the gap being varied in temperature dependence. Such a temperature compensation by means of a piston ring is suitable only in single-tube shock absorbers for influencing the damping forces in the outward and inward directions. The cross-section necessary for temperature compensation and formed by the piston ring requires that there is a relatively great clearance between the piston and the inner surface of the cylinder. If transverse forces occur, as to be expected when the shock absorber is used as a compression strut insert, this is disadvantageous, because in this case unilateral pressing of the piston on the cylinder inner wall occurs and thus the cross-sectional area is not precisely definable.

It is a primary object of this invention to obtain a shock absorber unit as defined above in which the variation of viscosity of the damping liquid in dependency of temperature variation is effectively compensated for, such that the damping characteristic remains substantially constant within a predetermined range of operational temperatures.

A further object of this invention is to obtain such temperature compensation with compensation components of simple, reliable and unexpensive structure.

A further object of this invention is to obtain a shock absorber unit which is highly suitable for the use in compression struts of vehicles as shown, for example, in U.S. Pat. No. 4,238,009 in view of obtaining temperature compensation of the damping characteristics even when the shock absorber unit is subject to lateral forces.

In view of these and other objects in accordance with the present invention, the throttling flow cross-sectional area is at least partially defined by at least one temperature sensitive member having a high coefficient of thermal expansion, such that said throttling flow cross-sectional area is reduced in response to increasing temperature.

By the reduction of the flow cross-sectional area the reduction in viscosity can be compensated for.

It is desired in view of safety and comfort consideration that the damping characteristics are constant in a temperature range of between about $-20°$ centigrade and $+50°$ centigrade.

The temperature sensitive member preferably consists of a synthetic plastic material, such as polyamide.

High coefficient of thermal expansion means that this coefficient is considerably higher than the coefficient of thermal expansion of usual structural materials used within shock absorber units, like steel.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 7 shows a partial view of the temperature sensitive member of FIG. 6 in a modified embodiment and FIG. 8 shows still a further embodiment of a by-pass.

Figure 1:
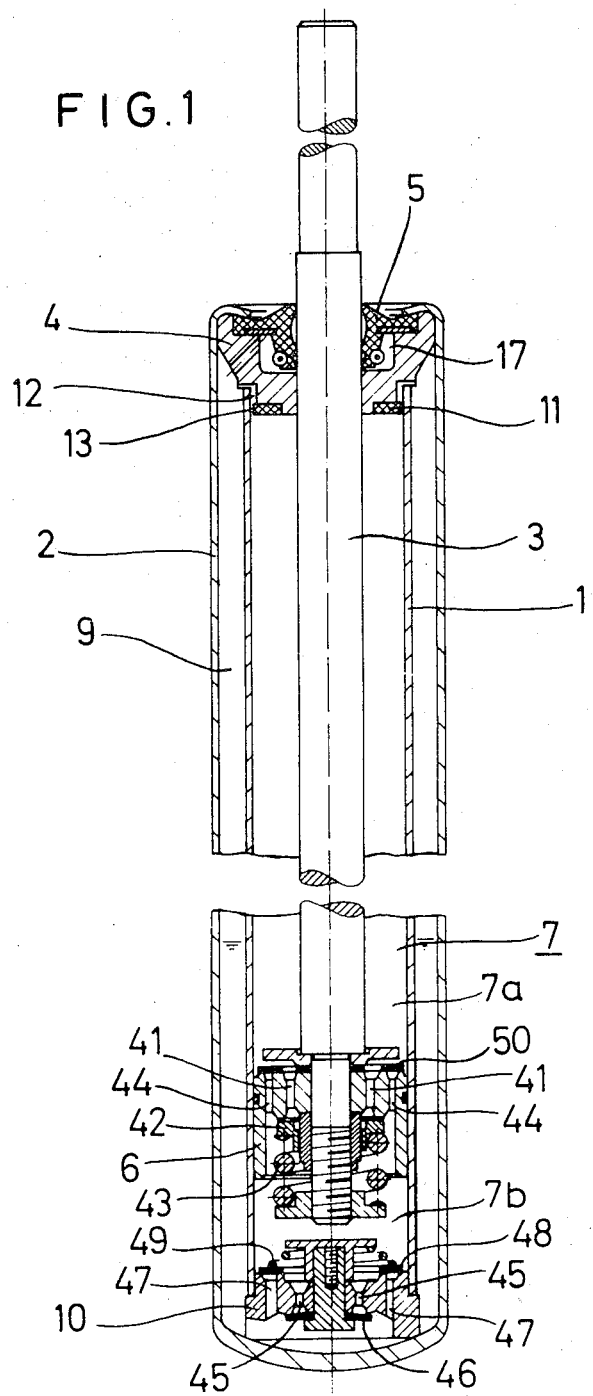
FIG. 1 shows a double-tube shock absorber.

The shock absorber as illustrated in FIG. 1 is formed as an insert of a compression strut. Such inserts are installed in what are called McPherson compression struts. The double-tube shock absorber consists of the cylinder 1 which is surrounded by the container 2, while a compensation chamber 9 is situated between the cylinder 1 and the container 2. The piston rod 3 is guided in the piston rod guide unit 4 secured to the container 2 and sealed off to the exterior by means of the piston rod seal member 5 housed within a seal chamber 17 of the guide unit 4. For the centering of the cylinder 1 in the container 2 there serve, on the one hand, the piston rod guide unit 4 and, on the other hand, the bottom valve unit 10. The piston 6 is firmly connected with the piston rod 3 and separates the cavity 7 of the cylinder 1 into the working chamber 7a above the piston and the working chamber 7b beneath the piston. The compensation chamber 9 is in communication with the working chamber 7b through valves of the bottom valve unit 10. The cavity 7 is filled with damping liquid and the compensation chamber 9 is partially filled with damping liquid and partially with gas.

Figure 2:
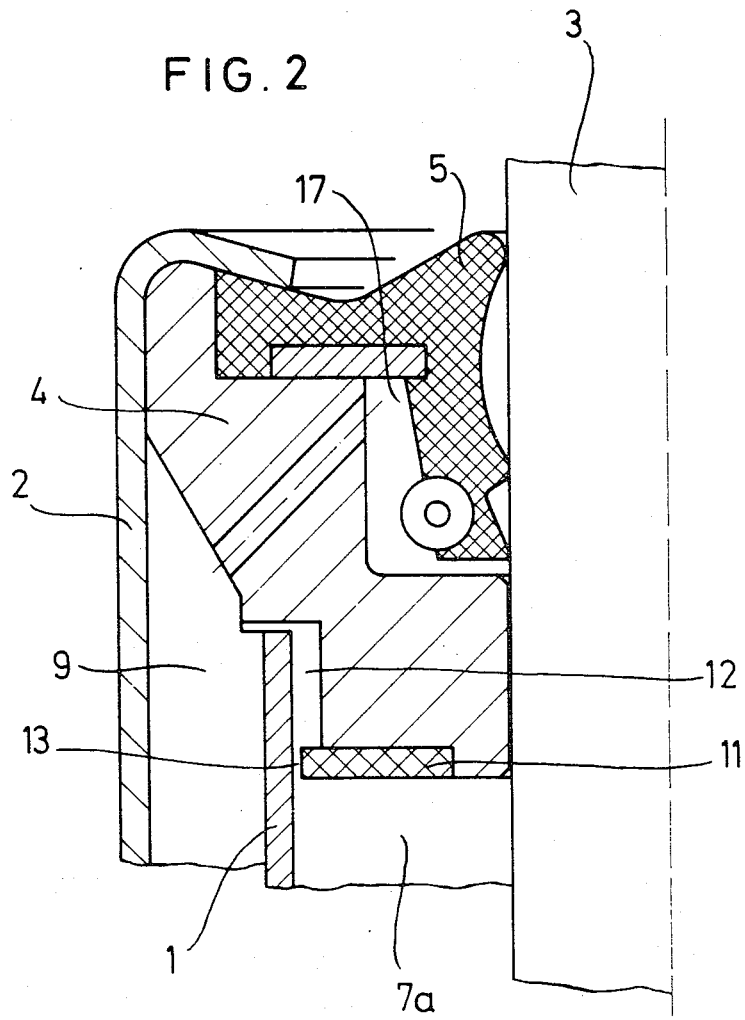
FIG. 2 shows in a sectional view according to FIG. 1 a first embodiment of the by-pass.

As shown in FIGS. 1 and 2, a component with a shape variable in dependence upon temperature is formed by a disc 11 which is connected with the piston rod guide unit 4 and with the inner surface of the cylinder 1 forms an annular gap 13, the flow cross-section of which is variable in dependence upon temperature. This disc 11 consists of a material with high coefficient of thermal expansion. Synthetic plastics materials, such as polyethylene or polyamide, are well suitable for this purpose. The annular gap 13 formed by the disc 11 produces a by-pass opening which is effective in both the outward and inward movement of the piston rod 3 and connects the upper working chamber 7a with the compensation chamber 9, said gap being connected in series with a passage or passages 12.

On outward movement of the piston rod 3 the damping liquid contained in the working chamber 7a flows through a first group of piston passages 41 throttled by a valve member 42 under the biasing action of a helical valve spring 43 towards the working chamber 7b. Moreover, damping liquid flows from the working chamber 7a through the gap 13 and the passages 12 into the compensation chamber 9. The damping force at such outward movement of the piston rod 3 is dependent on the flow resistances through the passages 41 and through the gap 13 resulting in a total flow resistance. This total flow resistance is reduced by reduction of viscosity occurring on increasing temperature. On the other hand, increasing temperature results in a reduction of the cross-sectional area of the gap 13. This reduction of the cross-sectional area results in an increase of the flow resistance through the gap 13 and also of said total flow resistance. The design and material of the disc 11 are such that on increase of temperature the increase of the total flow resistance resulting from reduction of the cross-sectional area of the gap 13 at least partially compensates for the decrease of the total flow resistance resulting from reduction of viscosity of the damping liquid et vice versa.

During the outward movement of the piston rod 3 the volume of the cavity 7 is reduced due to the piston rod 3 requiring less volume within the cavity 7. Damping liquid flows from the compensation chamber 9 through first bores 47 of the bottom valve unit 10 towards the lower working chamber 7b a valve plate 48 provided at the upper exit of the first bores 47 being lifted against the action of a coil spring 49.

On inward movement of the piston rod 3 the volume of the cavity 7 is reduced by the increasing volume required by the piston rod 3 within the cavity 7. Damping liquid escapes from the working chamber 7b through the bottom valve unit 10 into the compensation chamber 9 and simultaneously through second passages 44 of the piston 6 into the upper working chamber 7a. A high flow resistance through the bottom valve unit 10 occurs which is defined by second bores 45 and a throttling plate spring 46 provided at the lower exit of the bores 45. The first bores 47 are closed by the valve plate 48.

As the second bores 44 are open by the spring disc 50 being lifted from their upper exits, the flow resistance through the second passages 44 of the piston 6 is small as compared with the flow resistance across the second bores 45 of the bottom valve unit 10, such that the pressure occurring in the upper working chamber 7a is substantially equal to the pressure occurring in the lower working chamber 7b. The damping liquid of chamber 7a escapes through the gap 13 into the compensation chamber 9. The damping force on inward movement is therefore dependent on the flow resistance across the second bores 45 and the flow resistance through the gap 13, which flow resistances are in parallel and define again a total flow resistance. This total flow resistance is again constant at variable temperature, as reduction of viscosity is compensated for by increase of flow resistance through the gap 13.

The annular gap 13 is reduced in size as a result of temperature increase and thermal expansion of the disc 11. Of course here in place of the annular gap 13 a defined slot can be used which reduces in size on increase of temperature.

Figure 3:
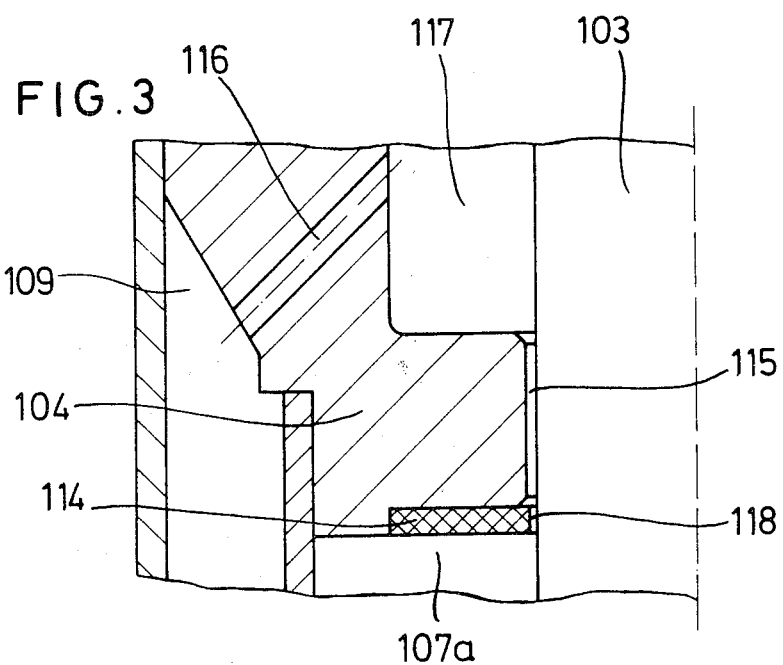
FIG. 3 shows a further embodiment of a by-pass.

The form of embodiment according to FIG. 3 differs from that according to FIGS. 1 and 2 essentially in that passages 115 are arranged between the piston rod 103 and the piston rod guide unit 104. The disc 114 consisting of a material with high coefficient of thermal expansion, forms with the outer surface of the piston rod 103 the annular gap 118 which varies in dependence upon temperature. In the outward and inward strokes the damping liquid flows from the working chamber 107a by way of the annular gap 118 and the passages 115 into the seal chamber 117 and thence through the bore 116 into the compensation chamber 109.

Figure 4:
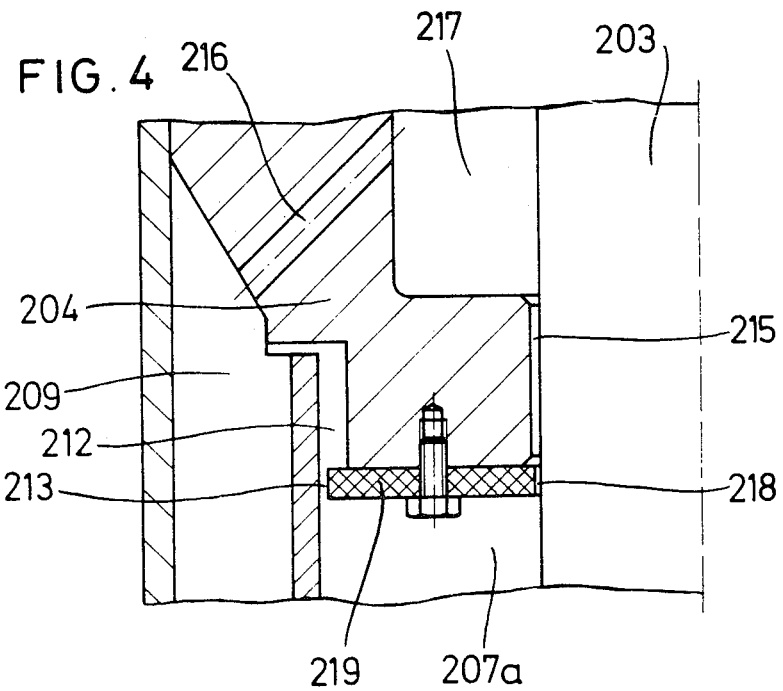
FIG. 4 shows still a further embodiment of a by-pass.

In the form of embodiment according to FIG. 4 the temperature-dependently acting disc 219 connected with the piston rod guide unit 204 produces the variable throughflow cross-sections through the annular gap 213 and the annular gap 218. These annular gaps 213 and 218 acting as by-pass openings in the outward and the inward strokes have the effect that the damping liquid flows out of the working chamber 207a into the compensation chamber 209 through both of these gaps. Thus the damping fluid passes, on the one hand, by way of the annular gap 213 and the passage 212 into the compensation chamber 209 and, on the other hand, by way of the annular gap 218, the passage 215, the seal chamber 217 and the bore 216 likewise into the compensation chamber 209.

Figure 5:
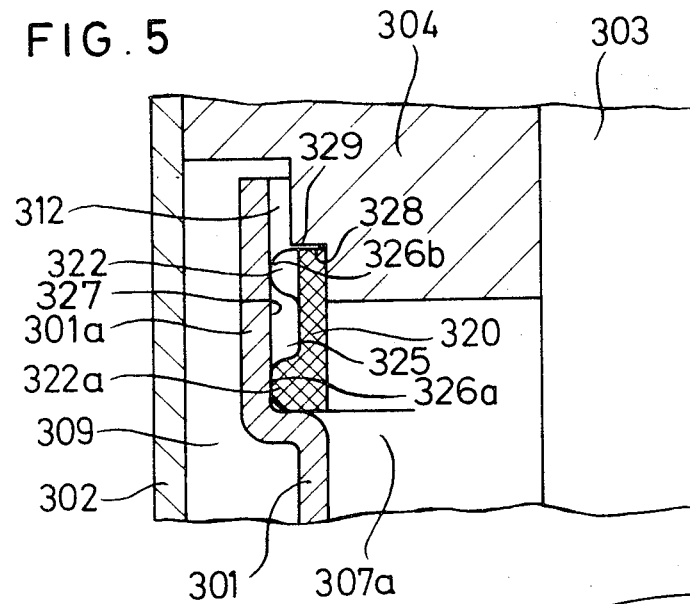
FIG. 5 shows still a further embodiment of a by-pass.
Figure 6:
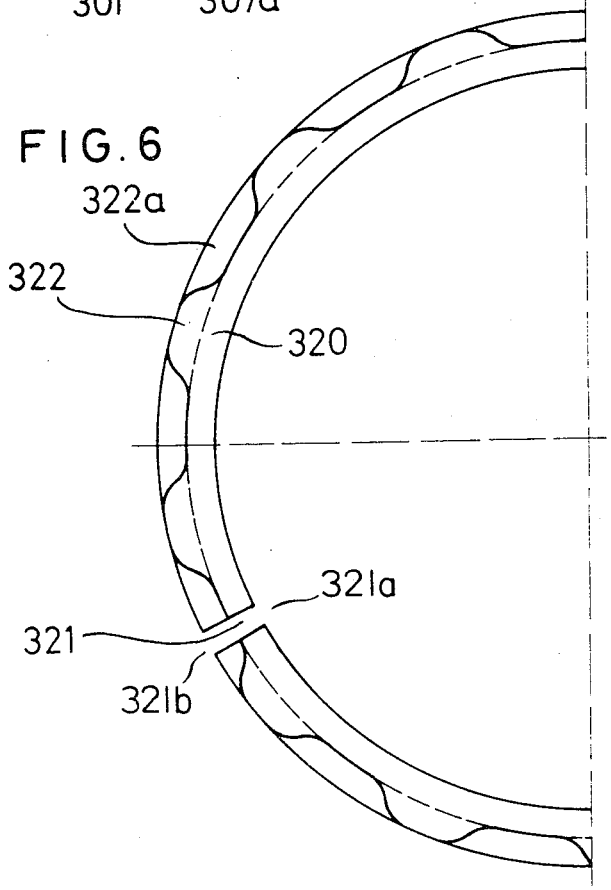
FIG. 6 shows an end view of a temperature sensitive member of the by-pass according to FIG. 5.

According to FIG. 5 the temperature-dependently variable component is formed by an open or gapped ring 320. This ring 320 is arranged between the piston rod guide unit 304 and an extension part 301a of enlarged diameter of the cylinder 301, and is fixed in the axial direction by the shoulder formed at the transition between the extension part 301a and the cylinder 301. This gapped ring 320 engages by upper and lower dogs 322 and 322a the inner face of the cylinder 301, as shown clearly by FIG. 6. The radially outer surfaces of dogs 322, 322a form a radially outer circumferential face 326a, 326b. The outer circumferential face 326a, 326b engages a circumferential supporting face 327 positioned near the adjacent end of the cylinder 301. The upper end face 328 of the ring 320 contacts a supporting face 329 on the piston rod guide unit 304. The supporting face is directed toward the lower end of the cylinder 30. The supporting faces 327, 329 are stationary with respect to the cylinder 301. The cross-section defined by the gap 321 here varies in temperature-dependence, that is with increasing temperature the cross-section formed by the gap 321 is reduced. This temperature-dependently varying by-pass opening formed by the gap 321 acts in the outward and inward strokes, in that a specific quantity of damping liquid flows out of the working chamber 307a by way of the gap 321 of the ring 320 and the passage 312 into the compensation chamber 309. The dogs 322 insure that the passage or passages 312 always communicate with the gap 321 irrespectively of the angular position of the gapped ring 320. The gap 321 has a radially inner or first exit 321a and an outer or second exit 321b. The first exit 321a is open to the cavity 307a and the second exit 321b is open toward the compensation chamber 309. Second exit opens into an annular collecting chamber 325 surrounding the axis of the cylinder. The collection chamber 325 is connected to the compensation chamber 309 by a passage 312 which extends from the end of extension 301a nearest piston rod guide unit 304 through to the annular collecting chamber 325. As can be seen from FIGS. 5 and 6 the passage 312 has an angular extent about the axis of less than 360 degrees.

In FIG. 7 there is again shown a gapped ring 420 provided with the upper dogs 422; the gap 421 is inclined with respect to a plane containing the axis of the cylinder 1 and extending through the gap 421. Such an obliquely extending gap 421 is advantageous especially when very high temperatures occur: if at such high termperatures the cross-section formed by the gap 421 is completely closed and a further temperature rise occurs the obliquely extending ring end faces can slide up over one another, whereby permanent deformation of the ring 420 is reliably avoided. In the installation of the ring 420 according to FIG. 7, in an embodiment according to FIG. 5, it is to be ensured that the ring 420 can move somewhat in the axial direction. In such a case it is necessary that the lower end of the ring 420 sealingly engages the radially inner face of the widened section 301a of the cylinder 301 by the annular projection 423. To compensate for the axial play of the ring 420 it can be expedient to arrange an annular elastic component as indicated by 440 in FIG. 7 which bears, on the one hand, on the shoulder formed at the transition between the widened portion 301a and the cylinder 301 and, on the other hand, on the lower end face of the ring 420.

FIG. 8 shows a further embodiment of a gapped ring 524. This ring 524 is arranged in an appropriate recess of the piston rod guide unit 504 and is biased in the axial direction by several resilient tongues 528, these tongues being integrally connected with a sleeve 527 clamped in between the cylinder 501 and the piston rod guide unit 504.

The gap (not shown) of the ring 524 is similar in shape to the gap 421 of the ring 420 in FIG. 7. In the outward or inward stroke damping liquid flows out of the upper working chamber 507a by way of the gap of the ring 524 into the annular groove 525, thence through the bores 526 into the seal chamber 517 and thence through the bores 516 into the compensation chamber 509. When the temperature at which the cross-section formed by the gap becomes zero is exceeded, the ring ends slide on one another, whereby the ring 524 slightly deflects the spring tongues 528. In this way non-elastic deformation is avoided in the case of this gapped ring 524 again.

The installation of the shock absorber of this invention within a compression strut is illustrated in U.S. Pat. No. 4,238,009.

The invention is not limited to the forms of embodiment as illustrated. It is easily conceivable that modifications are possible without deviating from the basic concept of this invention.

The reference numerals inserted in the following claims are only for better understanding these claims and are by no means restrictive.

What is claimed is:

1. In a shock absorber unit to be used particularly as an insert for a compression strut comprising
    a cylinder (1) having an axis and first and second ends, respectively, and defining a cavity (7) therein;
    a piston rod guiding and sealing unit (4, 5) adjacent said first end of said cylinder and including a piston rod guiding member (4);
    a piston unit (6) within said cavity (7) dividing said cavity (7) into two working chambers (7a, 7b) and being provided with at least one piston passage (41, 44) connecting said working chambers (7a, 7b);
    a piston rod (3) connected to said piston unit (6) within said cavity (7) and extending through said guiding and sealing unit (4, 5);
    a container (2) having first and second ends, respectively, adjacent said first and second ends of said cylinder (1), respectively, and surrounding said cylinder (1) such as to define a compensation chamber (9) outside said cylinder (1), said container (2) being closed at its second end by a bottom wall;
    a bottom valve unit (10) adjacent said second ends of said cylinder (1) and said container (2) providing a flow passage between said cavity (7) and said compensation chamber (9);
    means defining a by-pass (13, 12) between said cavity (7) and said compensation chamber (9) adjacent said first ends of said cylinder (1) and said container (2), respectively, said by-pass (13, 12) defining a throttling flow cross-sectional area (13);
    said cavity (7) being filled with a damping liquid;
    said compensation chamber (9) being partially filled with said damping liquid and partially with gas;
    the improvement comprising that
    said throttling flow cross-sectional area (13) is at least partially defined by at least one temperature sensitive member (11) having a high coefficient of thermal expansion, such that said throttling flow cross-sectional area (13) is reduced in response to increasing temperature,
    said throttling cross-sectional area being defined by a gap (321) between opposed ends of a gapped ring member (320),
    said gapped ring member (320) engaging by a radially outer circumferential face (326a, 326b) thereof a circumferential supporting face (327) adjacent said first ends of said cylinder (301) and said container (302) and engaging by an end face (328) thereof axially directed away from said second ends of said cylinder (301) and said container (302) an axially directed supporting face (329), both said supporting faces (327, 329) being stationary with respect to said cylinder (301), said gap (321) having a first exit (321a) toward said cavity (307a) and a second exit (321b) toward said compensation chamber (309), said second exit (321b) opening into an annular collecting chamber (325) surrounding said axis, said collecting chamber (325) being connected to said compensation chamber (309) by at least one passage (312) having an angular extent about said axis of less than 360°.

2. A shock absorber unit as set forth in claim 1 wherein said gapped ring member (320) is located in contact with both said cylinder (301) and said piston rod guide member (304).

3. A shock absorber unit as set forth in claim 2 said gapped ring member (320) being provided with radially outward directed projections (322, 322a), said projections being in engagement with the radially inner surface of said cylinder (301, 301a).

4. A shock absorber unit as set forth in claim 1 wherein said gap (421) of said gapped ring (420) is inclined with respect to a plane containing said axis and extending through said gap (421).

5. In a shock absorber unit to be used particularly as an insert for a compression strut comprising
- a cylinder (1) having an axis and first and second ends, respectively, and defining a cavity (7) therein;
- piston rod guiding and sealing unit (4, 5) adjacent said first end of said cylinder and including a piston rod guiding member (4,);
- a piston unit (6) within said cavity (7) dividing said cavity (7) into two working chambers (7a, 7b) and being provided with at least one piston passage (41, 44) connecting said working chambers (7a, 7b);
- a piston rod (3) connecting to said piston unit (6) within said cavity (7) and extending through said guiding and sealing unit (4, 5);
- a container (2) having first and second ends, respectively, adjacent said first and second ends of said cylinder (1), respectively, and surrounding said cylinder (1) such as to define a compensation chamber (9) outside said cylinder (1), said container (2) being closed at its second end by a bottom wall;
- a bottom valve unit (10) adjacent said second ends of said cylinder (1) and said container (2) providing a flow passage between said cavity (7) and said compensation chamber (9);
- means defining a by-pass (13, 12) between said cavity (7) and said copensation chamber (9) adjacent said first ends of said cylinder (1) and said container (2), respectively, said by-pass (13, 12) defining a throttling flow cross-sectional area (13);
- said cavity (7) being filled with a damping liquid;
- said compensation chamber (9) being partially filled with said damping liquid and partially with gas;
- the improvement comprising that
- said throttling flow cross-sectional area (13) is at least partially defined by at least one temperature sensitive member (11) having a high coefficient of thermal expansion, such that said throttling flow cross-sectional area (13) is reduced in response to increasing temperature;
- said throttling cross-sectional area is defined by a gap (321) between opposed ends of a gapped ring member (320);
- said gapped ring member (320) is located in contact with both said cylinder (301) and said piston rod guide member (304); and
- said gapped ring member (320) being provided with radially outward directed projections (322, 322a), said projections being in engagement with the radially inner surface of said cylinder (301, 301a).

6. A shock absorber unit as set forth in claim 1 wherein said gapped ring (524) is housed in an annular groove of said piston rod guide member (504), said by-pass comprising said annular collecting chamber (525) covered by said gapped ring (524) and said at least one passage comprising a plurality of bores (526) extending within said piston rod guide member and communicating with said annular collecting chamber (525).

* * * * *